United States Patent [19]
Leidvik

[11] 4,029,160
[45] June 14, 1977

[54] DRILLING MACHINE

[75] Inventor: Gustav Martin Leidvik, Bromma, Sweden

[73] Assignee: Stabilator AB, Bromma, Sweden

[22] Filed: Sept. 8, 1975

[21] Appl. No.: 611,421

[30] Foreign Application Priority Data
Sept. 16, 1974 Sweden .................. 7411647

[52] U.S. Cl. .................. 175/210; 173/33; 175/212
[51] Int. Cl.² .................. E21C 7/02; E21C 7/12
[58] Field of Search .................. 173/141, 32, 33; 175/209, 210, 211, 212

[56] References Cited
UNITED STATES PATENTS

| | | | |
|---|---|---|---|
| 2,145,939 | 2/1939 | Markley | 175/209 |
| 2,151,205 | 3/1939 | Hawn | 408/72 X |
| 3,033,298 | 5/1962 | Johnson | 175/209 |
| 3,351,143 | 11/1967 | Seibold et al. | 175/209 |
| 3,456,738 | 7/1969 | Harry | 173/32 X |
| 3,499,641 | 3/1970 | Peterson | 175/209 X |
| 3,550,701 | 12/1970 | Holly | 173/33 X |
| 3,610,349 | 10/1971 | Dempsey | 175/209 |

*Primary Examiner*—Ernest R. Purser
*Assistant Examiner*—William F. Pate, III
*Attorney, Agent, or Firm*—Schuyler, Birch, Swindler, McKie & Beckett

[57] ABSTRACT

A drilling machine for drilling floors or walls having a frame in which a drilling rod is displaced by a screw member. A container on the frame is placed around the drilling rod to fasten the frame to the floor or wall, to cool the drill, and to collect the drilling debris.

11 Claims, 4 Drawing Figures

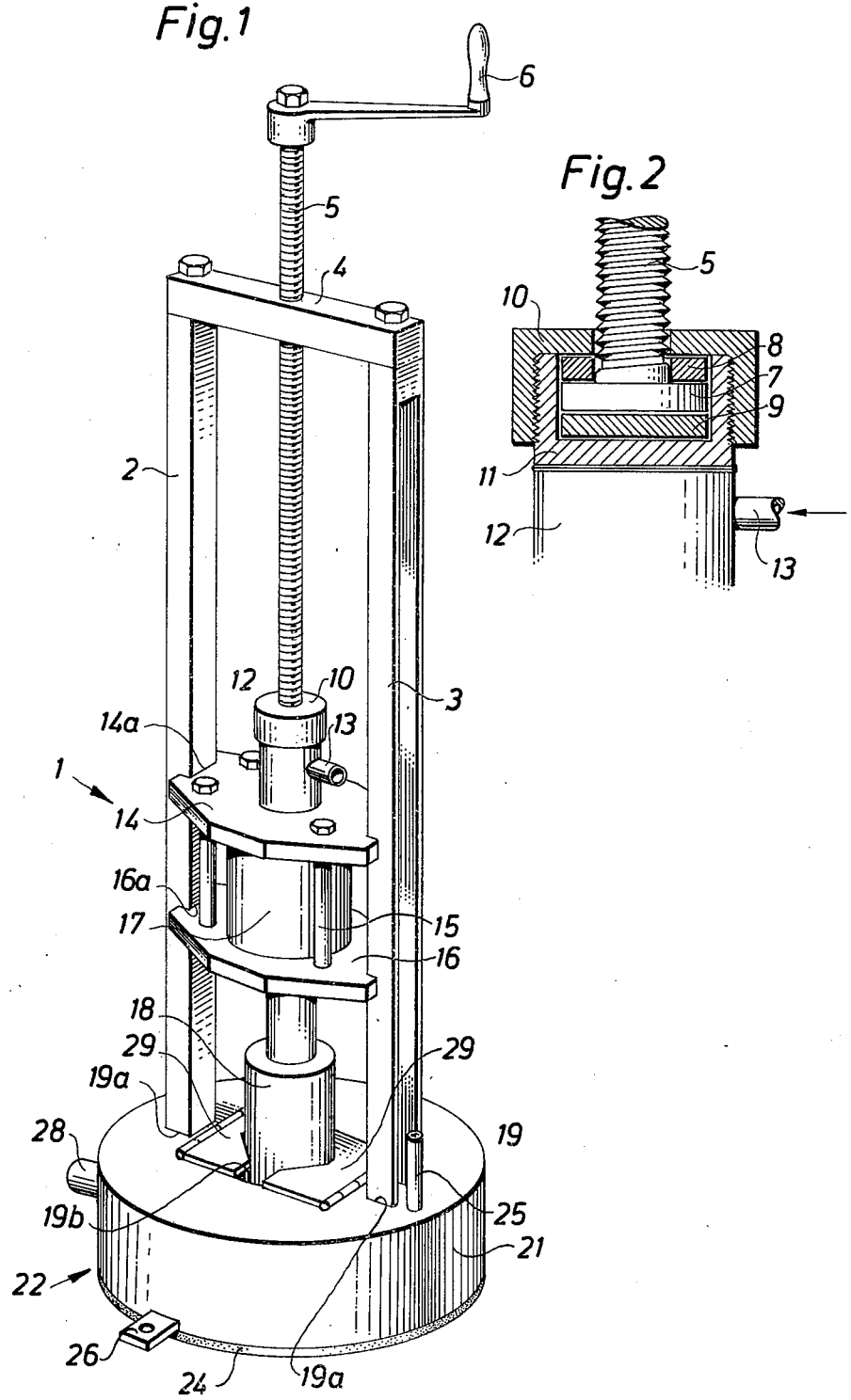

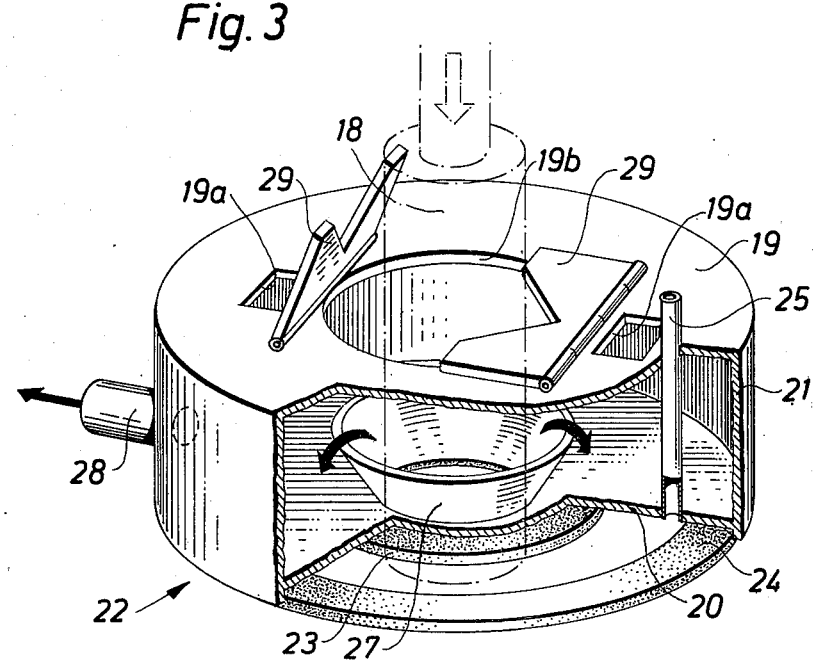
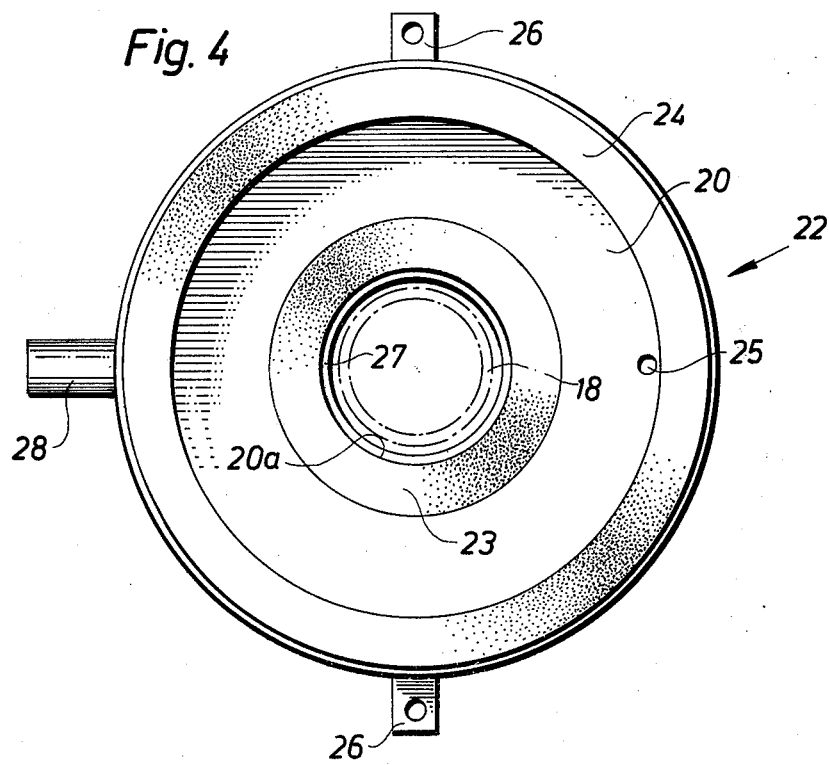

DRILLING MACHINE

The present invention relates to a drilling machine for drilling holes in structural building elements such as concrete floors and walls.

Machines for drilling holes in concrete floors are known. One known machine comprises a plate which is intended to be placed against the floor and which carries a frame structure in the form of a vertically extending rack. A drive means is movably mounted adjacent the rack. The drive means can be moved vertically, by means of a manually actuated device, such as a crank or a motor, and is connected to a horizontally outwardly extending arm on which there is mounted means for rotating a drilling bar attached to said manually actuated device. When drilling a hole in a floor, the manually actuated device connected to the drilling bar is rotated and the drive means, and therewith said manually actuated device and the drilling bar, are moved vertically downwards towards the floor by means of the crank or the like cooperating with the rack. When the drilling bar is pressed against the floor, a bending moment occurs between the drilling bar and the vertical frame structure, owing to the fact that the vertical axis of the drilling bar is located at a distance horizontally from the vertical axis of the frame structure. This bending moment attempts to lift the plate lying against the floor at its end facing the drilling bar, which causes the frame structure, and thus also the drilling bar, to be obliquely positioned relative to the floor, which in turn means that the drilled hole will not be vertical. Lifting of the frame structure during a drilling operation can be avoided by screwing the plate to the floor or by placing a downwardly load on the plate, although owing to the fact that a certain degree of play is always present between the different components of the drilling machine, especially between the rack of the frame structure and the drive means, there still occurs a certain bending moment, this bending moment increasing with the continued use of the machine. Since this bending moment occurs from the very instance that the drilling bar is brought into engagement with the floor, the hole will be slanted right from the start, which means that during the continued drilling of the hole the drilling bar is guided by the oblique hole so that the distance of the lower portion of the drilling bar from the frame structure as seen horizontally progressively increases during the drilling operation, thereby causing an impermissible oblique loaking of the machine components, which further contributes to an increased play therebetween. Because the drilling bar is subjected to oblique loads during a drilling operation, the drilling bar will be urged against certain portions of the side wall of the hole, which results in a reduction in drilling speed and an increase in wear on the drilling bit.

Furthermore, the known machines do not have provision for removing the water used to cool the drilling bit, or the sludge which is formed during a drilling operation. Neither are the known machines provided with means whereby the machine can be readily held to the surface in which a hole is to be drilled and released therefrom without impairing said surface. Known devices for holding the drilling machine against such a surface have no resilient means by means of which vibrations and tendencies to jamming of the drilling bar and oblique loading of said bar can be avoided. Furthermore, the known machines cannot readily be used for drilling holes in walls.

An object of the present invention is to provide a drilling apparatus with which the aforementioned disadvantages are at least substantially eliminated and to provide an effective, reliable and inexpensive composite drilling machine of relatively long serviceable life. These objects are fulfilled with a drilling machine having the characterizing features disclosed in the accompanying claims.

An embodiment of the invention will now be described with reference to the accompanying drawings in which;

FIG. 1 shows diagrammatically and in perspective a drilling machine according to the invention, FIG. 2 is a partially cut away side view of elements forming part of the drilling machine shown in FIG. 1 and effective to move the drilling bar vertically, FIG. 3 is a partially cut away perspective view of a water-collecting vessel adapted to cooperate with the lower portion of the drilling machine shown in FIG. 1, and FIG. 4 is a bottom plan view of the container shown in FIG. 3.

In FIG. 1 there is shown generally at 1 a drilling machine which, in the illustrated embodiment, comprises two vertical posts 2 and 3 having a U-shaped cross-section and the upper ends of which are suitably connected together by means of a horizontally extending, preferably hollow, square beam 4. Arranged centrally of the beam 4 is a hole which is provided with an internal thread and which extends perpendicularly to the long axis of the beam. Alternatively a nut may be welded in the hole. A threaded spindle 5 having a handle 6 mounted on the upper end thereof is screwed into the hole in said beam. A circular steel plate 7 (FIG.) is welded to the spindle 5 at the other end thereof and circular brass plates 8 and 9, of which the plate 8 is provided with a centre hole and is mounted on the spindle 5, are located on either side of the plate 7. A sleeve 10 having a centre hole and an internal thread is mounted on the spindle 5 and screwed onto a further sleeve 11 having an external thread and being welded to a tube 12. As will be seen from FIG. 2, the plates 7, 8, 9 are thus enclosed by the sleeves 10 and 11 in a manner such that the peripheral surfaces of said plates lie with a loose fit against the inner peripheral surface of the sleeve 11 and so that they can be readily turned relative to one another. When the handle 6 is turned clockwise, as seen in FIG. 1, the plate 7 on the spindle 5 will bear against the plate 9, which in turn presses against the bottom of the sleeve 11 so that the portions of the drilling machine 1, which will be described hereinafter and which are connected to the tube 12, are moved downwardly. When the handle 6 is rotated anticlockwise, the upper surface of the plate 7 bears against the plate 8, which in turn presses against the upper surface of the sleeve 10, so that said drilling machine components are moved upwardly.

The tube 12 is provided with an inlet stud 13 to which a water hose can be connected, and is welded to a bearing plate 14 which is connected by four distance bolts 15 to a further bearing plate 16 which is identical to the plate 14. Arranged between the plates 14 and 16 is a drive means 17 for a drilling bar 18 forming part of the drilling machine. The drive means 17 may, for example, comprise an electric motor or a gear which is connected through a flexible cable to a suitable motor located at a distance from the drilling machine 1. The tube 12, or an extension thereof, extends through the plates 14 and 16 provided with central holes and through the drive means 17, and is connected by a thread joint at its lower portion to the tubular drilling bar 18, the lower peripheral edge of which is provided with a suitable cutting bit.

Each of the two bearing plates 14 and 16 is provided on the sides thereof facing the posts 2 and 3 with two recesses 14a and 16a respectively which partially embrace the posts so that the plates 14 and 16, the drive means 17, the tube 12, the drilling bar 18, etc cannot move laterally or be rotated relative to the posts, but can readily be moved in their longitudinal direction when the crank 6 is turned in either direction. The recesses 14a and 16a may optionally be provided with a friction reducing material to facilitate vertical movement of the plates 14 and 16.

The posts 2 and 3 pass through holes 19a arranged in a circular plate 19 which forms the upper plate of a container 22, said posts being optionally welded to the surfaces defining said holes 19a. Also arranged in the plate 19 is a circular hole 19b. The plate 19 together with a bottom plate 20 (FIGS. 3 and 4), having a circular hole 20a arranged therein, and a vertical tube 21 form the container 22. The lower ends of the posts 2 and 3 are welded to the bottom plate 20 (not shown). Instead of passing the posts through holes in the plate 19 and welding said posts to the surfaces defining the holes receiving said posts and welding the lower ends of said posts to the plate 20, the plate 19 and the lower ends of the posts may be provided with suitable coupling means (not shown) so constructed as to permit the posts with the elements attached thereto to be connected and released from the container 22 when so desired. Such a coupling arrangement may be desirable, for example, when the drilling machine is used to drill holes in vertical walls, wherein the machine must be lifted and adjusted to the exact position of the hole to be drilled, which may be difficult since the machine is relatively heavy. When boring holes in vertical walls using a drilling machine having a detachable container, the container is attached to the wall first, whereafter the remainder of the machine is connected to the container by means of the coupling means.

The outer diameter of the driling bar 18, which is shown in FIGS. 3 and 4 in chain lines, is much smaller than the diameter of the hole 19b and somewhat smaller than the diameter of the hole 20a, said drilling bar being adapted for vertical movement towards and away from the surface against which plate 20 rests and in which a hole is to be drilled whose diameter corresponds to the outer diameter of the drilling bar 18.

The hole 20a in the bottom plate 20 receives therearound a sealing ring 23 which is attached to the under surface of the bottom plate (FIGS. 3 and 4). A larger sealing ring 24 is also mounted to the under surface of the bottom plate 20 and bears, via a portion of the outer periphery of said ring, against a downwardly extending edge on the tube 21 to prevent the ring from being moved out of its position. Between the sealing rings 23 and 24, which are suitably made of a rubber material, there is thus formed a space which can be placed in communication with a source of vacuum (not shown) via a vertically extending tube 25 attached to the container 22.

When the container 22 is brought into abutment with the surface in which a hole is to be drilled, the source of vacuum is activated and air is sucked from the space between the sealing rings 23 and 24 through the tube 25. When the said surface is relatively smooth, i.e. is not porous or is not highly irregular, the container 22 will be drawn firmly against said surface, thereby to ensure reliable anchoring of the drilling machine thereagainst, such that the drilling machine cannot be moved relative to said surface. Although the drilling machine is held firmly to the surface in this manner, the arrangement of the rubber rings 23 and 24 is such as to permit a degree of pivoting movement of the container 22 and the drilling machine 1 in all planes, such movements having been found particularly advantageous should the drilling bar 18 tend to stick or if for some reason, the drill is subjected to an oblique load during a drilling operation. In addition, the rubber rings absorb a large portion of the vibrations generated by the drilling machine during a drilling operation. Such anchoring means using a source of vacuum cannot be used, however, when the surface to be drilled is porous or highly irregular, in which case the drilling machine 1 must be anchored to said surface in some other way, for example by mounting the container 21 to said surface by means of, for example, bolts screwed thereinto, for which purpose brackets 26 having holes provided therein may be welded to the tube 21. Alternatively the container may be fixed by means of tensioning devices arranged between the machine and a wall or the ceiling. The aforementioned pivoting movement and vibrations are still permitted and absorbed respectively by the rings 23 and 24 also with attachment means which do not employ a source of vacuum.

As will readily be understood, the container 22 need not have the form shown in the drawings, but can be constructed to suit any particular use. Thus, if the drilling machine 1 is to be used for drilling holes in a floor at a location adjacent a wall (or in a wall at a location adjacent a floor) the container 22 is suitably divided in a plane coinsiding with the vertical plane which includes the two posts 2 and 3, and the vertical planar of the container, which is closed by means of a planar plate, is turned against the wall (or the floor) and hence the drill bar 18 can be placed close to the wall (or the floor). With such an embodiment, and also with other concievable embodiments of the container 22, the shape and positioning of the rubber seal 23 and 24 is adapted to the form of the bottom plate 20 so that there is always formed between said rubber seals a space to which a vacuum source can be connected, said space conveniently including portions located on at least two opposing sides of the drilling bar 18 — preferably immediately beneath the positions where the posts 2 and 3 are attached to the container 22 — so that stabilization of the container, and therewith of the drilling machine 1 as a whole, is as effective as possible.

As described in the aforegoing, water is charged to the drilling machine 1 through the inlet pipe 13. This water, which is intended to cool the cutting bit of the drilling bar 18, is taken from a suitable pump (not shown) to the pipe 13 through the tube 12, which is arranged within the drive means 17 and through the hollow drilling bar 18 to the cutting bit. During a drilling operation, i.e. when the drilling bar 18 is forced into abutment with said surface by turning the handle 6 clockwise as seen in FIG. 1 and the drilling bar is rotated by the drive means 17, the water cools the cutting bit and is then forced out from the drilling bar via the cutting bit together with the material removed from said surface by drilling. The used cooling water is then forced upwardly on the outside of the rotating drilling bar 18 and is imparted a swirling movement by said bar. To decrease this turbulence and to reduce the rate at which the water flows, as well as to ensure a rapid and effective discharge of said used cooling water, there is mounted in the hole 20a of the bottom plate 20 a hollow, frusto-conical collar 27. The lower portion of the collar 27 projects slightly outwardly beneath the plate 20 to form an abutment surface for the inner sealing ring 23 so that said ring cannot be moved in towards the hole 20a. The collar 27 causes the used cooling water rotating with the drilling bar 18 to be fed out over the upper edge of the collar and to fall down into the container 22 without said water having any appreciable velocity component in the direction in which the drilling bar rotates. In the absence of such a collar 27, the cooling water would be thrown into the container 22 and would rotate around the walls thereof at a high speed, which would render it difficult to remove the water from the container. The substantially stationary water in the container 22 can readily be removed therefrom through an outlet pipe 28, the outlet of which is located in the container wall 21 immediately adjacent to the bottom plate 20, either by using the inherent pressure of the water or by means of a pump.

For stabilizing the drilling bar 18 during the initial stage of a drilling operation, i.e. when the drilling bar is brought into contact with and is pressed against the surface in which a hole is to be drilled, stabilizing means are conveniently attached to the container 22 or to the posts 2 and 3. As shown in FIG. 3, such stabilizing means may comprise plates 29 which are provided with triangular recesses and which are mounted on the upper container plate 19 and are pivotable into and out of engagement with the drilling bar.

Although only one embodiment of the invention has been described with reference to the accompanying drawings, the invention is not restricted to this embodiment. The described and illustrated machine can be modified in many ways within the scope of the claims. In one such modification the handle 6 can be exchanged for a motor mounted on the beam 4 and/or on the posts 2 and 3.

I claim:

1. A drilling machine for drilling holes in structural building elements, such as concrete floors or walls, comprising
   a. a frame structure (2, 3) in which a drilling bar (18) having a cutting bit is displaceably mounted for movement relative to the structural element;
   b. a container (22) which at least partially surrounds said drilling bar (18) and which is adapted to collect the cooling liquid used to cool said cutting bit of said drilling bar and to collect the slurry formed during a drilling operation, said container (22) including a bottom plate (20) arranged to face towards the structural element and having a circular opening (20a) which receives said drilling bar (18);
   c. a collar (27) arranged in said opening (20a) having an inner surface for blocking the cooling liquid and slurry mixture thrown off by said drilling bar, said collar further having an upper edge over which the mixture is fed to the interior of said container (22) to form a substantially stationary reservoir therein; and
   d. an outlet (28) in said container (22) for draining the reservoir from said container (22).

2. A drilling machine according to claim 1, characterized in that the collar (27) has the form of an upwardly extending hollow, frusto-conical cone, the smallest opening of which is mounted in the said circular opening (20a) of the bottom plate (20).

3. A drilling machine according to claim 1, characterized in that said container (22) is further provided with an upper plate (19) having an opening (19b) the diameter of which is greater than the outer diameter of said drilling bar and to which the frame structure (2, 3) is attached.

4. A drilling machine according to claim 1, characterized in that said frame structure comprises posts (2, 3) which are detachably attached to said container (22) by means of a coupling device.

5. A drilling machine according to claim 1, characterized by a tube (12) through which the cooling liquid is intended to be conveyed to said cutting bit, said tube, or an extension thereof, being arranged substantially in line with said drilling bar (18).

6. A drilling machine according to claim 1, characterized in that the under surface of said bottom plate (20) supports resilient elements (23, 24).

7. A drilling machine according to claim 5, characterized in that the resilient elements (23, 24) sealingly abut the structural element and together with the bottom plate (20) and the upper surface of the structural element define a space which can be communicated with a source of vacuum.

8. A drilling machine according to claim 5, characterized in that the bottom plate (20) is circular and has arranged therein a central opening (20a) for receiving said drilling bar (18), in that a first ring-shaped, resilient element (23) surrounds said opening, and in that a second ring-shaped resilient element (24) having a larger inner diameter than the outer diameter of the first ring-shaped resilient element surrounds the latter element so that a substantially ring-shaped space is formed between said elements.

9. A drilling machine according to claim 1, characterized in that said container (22) is provided with bracket means (26) for attaching the container to said structural building element.

10. A drilling machine according to claim 1, characterized in that the container (22) is provided with means (29) for guiding the drilling bar (18).

11. A drilling machine according to claim 2, characterized in that said container is further provided with a vertical tube (21) which joins the outer edges of said upper (19) and bottom (20) plates; opposed plates (29) pivotally mounted in said opening (19a) of said upper plate (19), said plates having recesses therein to guide said drilling bar (18).

* * * * *